May 4, 1954        D. MALDARI        2,677,335

MACARONI DIE

Filed April 27, 1950

INVENTOR.
DONATO MALDARI
BY
Pearson + Pearson
ATTORNEYS

Patented May 4, 1954

2,677,335

UNITED STATES PATENT OFFICE 2,677,335

MACARONI DIE

Donato Maldari, New York, N. Y.

Application April 27, 1950, Serial No. 158,473

8 Claims. (Cl. 107—14)

This invention relates to a new and improved macaroni product and a new and improved macaroni die for producing the same.

The principal object of my invention is to provide a macaroni product in open tubular form with high circumferential fins, separated by deep angular channels, of uniform width on the exterior surface thereof.

A further object of my invention is to produce fins which are flat and perpendicular to the curled web of macaroni.

Another object of my invention is to produce high circumferential fins on a curled web of macaroni, each fin having identical ruffles which do not approach or touch each other at any point.

A still further object of my invention is a macaroni die having bores, channels and slotted apertures so fashioned as to produce my new macaroni product.

It is to be understood that the die described in this application is one of a number of similar dies inserted in a die plate, the die plate being located below the cylinder of a dough press. Dough in plastic condition is forced from the cylinder of the dough press out through apertures in the dies of the die plate and the macaroni product is then cut off to fall into a bin or chute. This apparatus and process is well known in the art and therefore is not shown or described herein.

In the drawing, Fig. 1 is a fragmentary plan view of a die plate from the dough feeding side and showing one of my new dies positioned therein.

Figure 1:
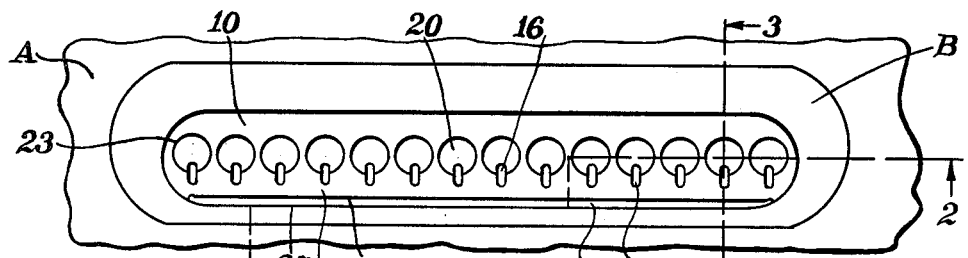
Figure 2:
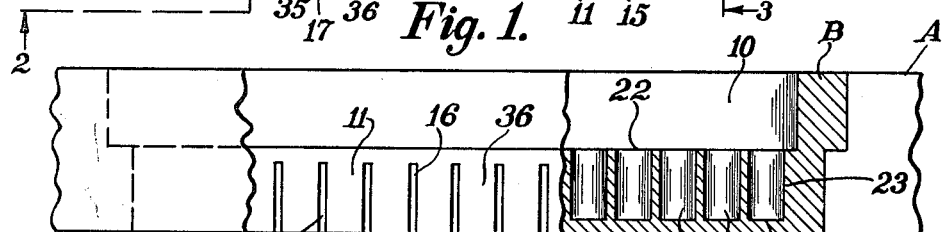
Fig. 2 is a sectional view of the device shown in Fig. 1 with parts thereof broken away to expose certain details, on line 2—2 of Fig. 1.

As shown in Figs. 1 to 4, A is a fragment of a die plate with my new die B inserted therein. A dough receiving recess 10 is provided in die B into which plastic dough suitable for extrusion is forced by the dough press (not shown). A narrow elongated channel 11 is provided through the die B, to connect the dough receiving recess 10 with the narrow elongated slot 12, of the aperture 14 of my die. In view of the friction of the walls 35, 36, of the channel 11, a thin web of macaroni 112 is extruded, relatively slowly, from slot 12.

My die aperture 14 comprises the narrow elongated slot 12 and a plurality of short slots 15, all on the same side of slot 12, the short slots being uniformly spaced apart and perpendicular to slot 12. A narrow channel 16, equal in width to channel 11 of slot 12, and equal in length to each slot 15, connects the dough receiving recess 10 with each slot 15 of aperture 14 and also enters wall 36 of channel 11. As shown, a strip of the material of the die, at 17, is left for strengthening purposes, but the plastic dough forced through channel 16, joins the dough forced through channel 11 after passing strip 17. A plurality of uniformly spaced perpendicular fins 115 are thus attached to one surface of the elongated web 112, as the web passes through channel 11 and an integrally finned web is thus extruded through aperture 14, each fin being separated by a deep angular groove 118, formed by the material of the die between slots at 18.

In order to curl my finned web of macaroni into open tubular form, I provide a dough feeding bore 20 above and to the rear of each short slot 15, and beside each channel 16. The increased area of bore 20 causes the dough to be extruded more rapidly through slots 15 than through slot 12, thus urging the macaroni product into the curled or open tubular form shown in Figs. 3, 5, 6 and 7. Bore 20 is cylindrical, having a closed bottom at 21, an open top at 22, for receiving dough from recess 10, and a vertical circular wall 23. Channel 16 intersects wall 23 from top to bottom and extends into bottom 23 about one fourth of the distance across the bottom. Channel 16, thus connects directly with dough receiving recess 10 at 50 and also connects throughout its depth with bore 20.

While low circumferential ridges or ribs have previously been produced on the exterior surface of curled macaroni products, as far as I am aware, comparatively high circumferential ribs similar to the prominent fins of my device, have not hitherto been successful. This is for the reason that such fins have failed to support themselves and have formed irregular waves or have collapsed against each other. I overcome this disadvantage, and produce, upstanding, self-supporting fins because my channel 16 connects directly with dough recess 10. By so doing I secure, between the slow moving macaroni extruded from slot 12 and the faster moving macaroni extruded from the outer end of each slot 15, under its dough feeding bore 20, a portion forming the base of the fin 115 at 119a, which travels more rapidly than the web 112 but less rapidly than the outer portion of the fin 115 at 120a.

The web 112 of my product is thus curled into open tubular form by the pressure of extrusion of fins 115, the speed of extrusion of the fin becoming greater toward its outer circumference and thus preventing folds, waves, or ruffles from forming in the fin.

I find it convenient to use one of the inner faces 30 of the die opening 31 in plate A to form one of the walls 35 of channel 11, as shown in the drawing, and I provide shoulders 32 on the die B to seat the same in opening 31 of plate A.

Figure 3:
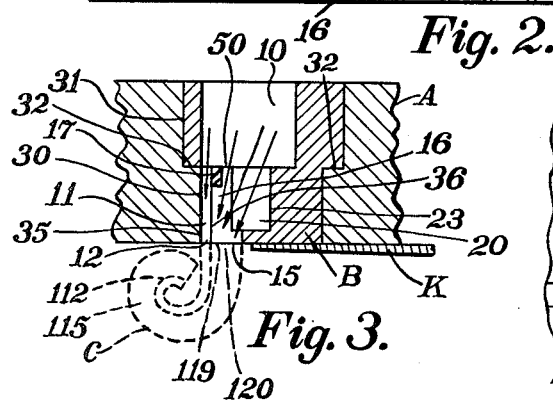
Fig. 3 is a sectional view of the device shown in Fig. 1, on line 3—3 of Fig. 1.
Figure 4:
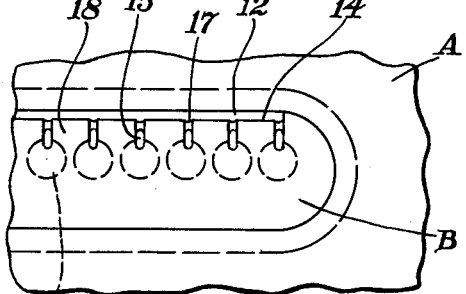
Fig. 4 is a bottom view of the die plate fragment shown in Fig. 1, from the extrusion side and showing the die apertures.

In Fig. 3, I show my new product C, being extruded from die B, and ready for cutting by a knife such as K. Arrows are also shown in Fig. 3, to indicate the relative speed of passage of the macaroni through channel 11 and out slot 12, through part 59 of channel 16 and out part 119 of slot 15 and through bore 20, channel 16 and out part 120 of slot 15.

Figure 5:
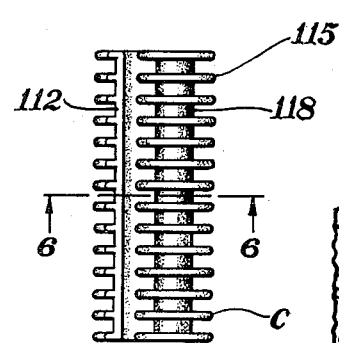
Fig. 5 is a plan view of my new macaroni product produced by my new die.
Figure 6:
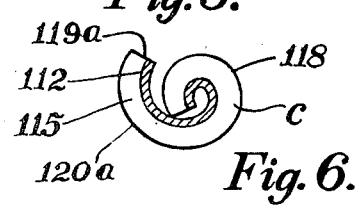
Fig. 6 is a sectional view of the product shown in Fig. 5, on line 6—6 of Fig. 5.
Figures 7, 9:
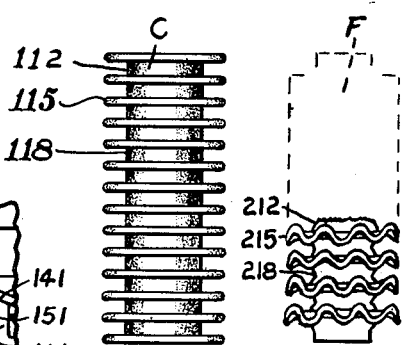
Fig. 7 is a bottom view of the product shown in Fig. 5.
Fig. 9 shows the product of the die of Fig. 8.

In Figs. 5, 6, and 7, I show my new product C with web 112 curled into open tubular form and circumferential ribs 115 uniformly spaced along the exterior surface thereof. Deep angular grooves 118 are shown between fins 115 and each fin is perpendicular to the web throughout its height. The thickness of each fin and web is the same in order that each will become cooked at the same time. It should be noted that at no point does one fin touch another to make a double thickness requiring extra cooking time.

Figure 8:
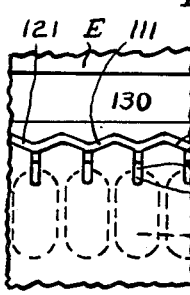
Fig. 8 is a view similar to Fig. 4 of a modification.

As shown in Fig. 8, the longitudinal slot 121 and longitudinal channel 111 of a die such as E may be undulated rather than straight to give a V-shaped bottom to the deep angular grooves such as 218 in the product F shown in Fig. 9. The short slots 151 and channels 161, similar to 15 and 16, may be each associated with an elongated dough feeding bore 201, rather than the cylindrical bore 20, to give a greater curling effect. In view of the increased curl provided by bore 201, I may provide a trough 130 in die E, opposite the aperture 141, to accommodate the dough extruded therethrough.

The elongated dough feeding bores 201, being of larger capacity than bores 20, create identical, evenly spaced ruffles on the fins 215 of web 212 and it should be noted that all ruffles are equidistant from adjacent ruffles and that the grooves 218 are thus of uniform width throughout their circumferential length.

I claim:

1. A die for forming macaroni or the like, having an elongated dough receiving recess in one face of the die, a dough discharging aperture in the opposite face of the die, the aperture embodying three or more lateral slots spaced along, and extending perpendicularly from, one side of a longitudinal slot formed in the opposite face of the die; a longitudinal channel extending through the die and connecting the bottom of the dough receiving recess with the lateral slots; three or more identical dough receiving bores associated with said lateral slots, each said bore extending from the bottom of the dough receiving recess nearly through said die to a point above and substantially beyond the end of each lateral slot; and three or more lateral channels, each lateral channel extending substantially through said die and connecting each lateral slot with the side of said longitudinal channel, with the bottom of said dough receiving recess and with the side and bottom of said dough receiving bores; said longitudinal and lateral channels and slots being of equal width.

2. A die for forming macaroni or the like, having a dough receiving recess in one face thereof; a dough discharging aperture, including a plurality of lateral slots extending from one side of a longitudinal slot formed in the other face of the die; a longitudinal channel, adapted to guide dough from said recess out said longitudinal slot in the form of an elongated web; a plurality of identical dough receiving bores each associated with a lateral slot and each extending nearly through said die and a plurality of identical lateral channels each extending through said die, above each lateral slot, and connecting the recess, bores, longitudinal channel and lateral slots, each lateral channel being adapted to guide dough directly from the bottom of said recess to said longitudinal channel to form the base of a series of fins on said elongated dough web and to guide dough directly from the bottom of said bores to said lateral slots to form the terminal portion of said fins.

3. A die for forming macaroni or the like having an elongated dough receiving recess of substantial width and depth in one face of the die; a dough discharging aperture parallel to, and of substantitlly the same length as said recess in the opposite face of said die, said aperture having an elongated web slot, for producing a web from dough extruded therethrough, and a plurality of shorter, lateral fin slots spaced along and intersecting one side of said slot for producing fins along one side of said web; an elongated web channel of uniform cross sectional area equal to the area of the longitudinal slot of said aperture extending through said die and connecting said slot directly with said recess; a plurality of identical die bores spaced from said web channel and aligned parallel thereto between said recess and said aperture, each bore having straight vertical side walls and a closed flat bottom; and a plurality of fin channels each of a cross sectional area equal to the area of a fin slot of said aperture and each connecting laterally with the web channel, each connecting downwardly with a fin slot of said aperture, and each extending less than halfway into the closed bottom of its bore.

4. A die as specified in claim 3 including an integral reinforcing strip formed in the die and of rectangular cross section extending across the upper portion of each fin channel adjacent said web channel.

5. A die as specified in claim 3 wherein each bore is circular in cross section.

6. A die as specified in claim 3 wherein each bore is substantially elliptical in cross section and the longitudinal axis thereof is perpendicular to said web channel.

7. A die as specified in claim 3 wherein the web slot and its channel are undulated to form identical curves on the extruded web between each adjacent pair of fin slots.

8. A macaroni die having an elongated dough receiving recess in its inner face; an elongated web extrusion channel extending longitudinally along one side of the bottom of said recess; and a plurality of identical dough receiving bores aligned along the bottom of said recess, parallel to but spaced from said web channel, each bore having straight vertical walls and a horizontal closed bottom and a plurality of identical fin extrusion channels each extending laterally between said web channel and the adjacent side wall of a bore, each said fin channel including a vertical passage into the bottom of said dough receiving recess at one end and a vertical passage into the bottom of the dough receiving bore at its opposite end.

References Cited in the file of this patent

UNITED STATES PATENTS

| Number | Name | Date |
|---|---|---|
| D. 92,591 | De Palo | June 26, 1934 |
| D. 96,161 | Cirillo | July 9, 1935 |
| 466,230 | Gent | Dec. 29, 1891 |
| 1,822,904 | Penza | Sept. 15, 1931 |
| 1,946,238 | Ronzoni | Feb. 6, 1934 |
| 1,959,006 | Penza | May 15, 1934 |
| 2,045,421 | Tanzi | June 23, 1936 |
| 2,049,754 | Tanzi | Aug. 4, 1936 |